United States Patent [19]
Sander

[11] 4,055,769
[45] Oct. 25, 1977

[54] METHOD AND APPARATUS FOR CURING, A COATING ON A SUBSTRATE

[76] Inventor: Conrad Sander, Panoramastrasse 55, D-7441 Zizishausen, Germany

[21] Appl. No.: 594,366

[22] Filed: July 9, 1975

Related U.S. Application Data

[62] Division of Ser. No. 343,179, March 20, 1973, abandoned.

[30] Foreign Application Priority Data

Mar. 21, 1972 Germany ............................ 2213831

[51] Int. Cl.$^2$ ............................................ G01J 1/00
[52] U.S. Cl. .................................. 250/492 R; 250/504
[58] Field of Search .................... 250/492 R, 503, 504; 350/294

[56] References Cited

U.S. PATENT DOCUMENTS

| | | | |
|---|---|---|---|
| 1,256,522 | 2/1918 | Croxton | 250/503 |
| 2,139,797 | 12/1938 | Boerstler | 250/504 |
| 2,423,884 | 7/1947 | Glass | 250/504 |
| 2,645,709 | 7/1953 | Thorstensen | 250/504 |
| 3,008,242 | 11/1961 | Sites et al. | 117/93.31 |
| 3,118,065 | 1/1964 | Rijnders | 250/504 |
| 3,733,709 | 5/1973 | Bassemir et al. | 117/93.31 |

*Primary Examiner*—Alfred E. Smith
*Assistant Examiner*—Bruce C. Anderson
*Attorney, Agent, or Firm*—Roylance, Abrams, Berdo & Kaul

[57] ABSTRACT

A coating of an exothermically reacting organic substance, which does not have any photoinitiators, applied to a substrate is cured with ultraviolet rays having, among other wavelengths, a wavelength of 197.4 nm. This is accomplished in that sufficient radiation density to initiate the exothermic reaction of the substance is produced at a sufficient distance, with respect to temperature, from a mercury-vapor tube. The mercury-vapor tube employed for producing the ultraviolet rays has a casing of quartz. Means for focussing rays into beams are associated to this tube.

4 Claims, 4 Drawing Figures

METHOD AND APPARATUS FOR CURING, A COATING ON A SUBSTRATE

Figure 1:
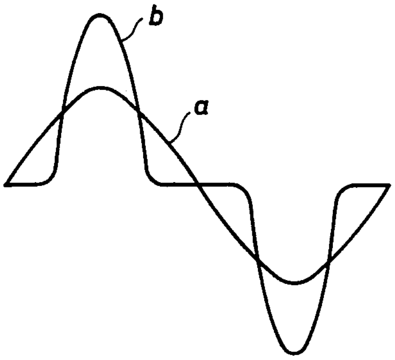

This is a division of application Ser. No. 343,179, filed Mar. 20, 1973 now abandoned.

The present invention relates to a method for curing a coating which is applied to a substrate and which comprises an exothermically reacting organic substance without photoinitiators, especially coating materials which dry through oxidation, with ultraviolet rays having, among other wavelengths, a wavelength of 197.4 nm, and an apparatus for performing the above method. An exothermically reacting substance is a substance which gives off energy during its reaction. A varnish which dries by oxidation is considered to be a synthetic-resin varnish or oil varnish.

In a known method of curing a film of an unsaturated polyester, a photosensitizer is added to this material. By being exposed to flashes of ultraviolet light of at least 50 watt seconds per flash, whereby the flashes have photochemically active wavelengths, these photosensitizers release radicals which initiate the chemical reaction in the polyester film. Since the quantity of photosensitizers which is added to the polyester amounts to 0.5 to 5% thereof, an initial reaction will only occur in up to 5% of the area of the surface of the irradiated polyester film. A plurality of flashes are therefore necessary in order to attain the desired hardness. In order to save time, a plurality of flash tubes are employed which produce flashes one after the other. The amount of light which is required for curing the polyester film can be reduced if the substrate to be coated with this film is first primed with a ground coating upon which the polyester film is then applied, whereupon this primed and coated substrate is then subjected to a heat treatment before being subjected to ultraviolet rays (British Pat. No. 1,107,534).

It has already been proposed to subject a coating material of an exothermically reacting organic substance to at least one pulse of ultraviolet rays having, among other wavelengths, a wavelength of 197.4 nm.

According to the invention, a mercury-vapor tube is to be employed as the source of radiation, although the coating material cannot pass by in its immediate vicinity due to its high surface temperature. The employment of a tube of this type is made possible in that sufficient radiation density to initiate the exothermic reaction of the substance is produced at a sufficient distance, with respect to temperature, from a mercury-vapor tube. The radiation density existing in the immediate vicinity of the tube would be sufficient to initiate an exothermic reaction. However, because of the surface temperature of the tube of 600° to 700° C, the coating material can only be passed by at a sufficient distance so as to ensure that the temperature of the mercury-vapor tube does not have any disadvantageous influence on the coating material or its substrate. This is possible if a sufficient radiation density is produced at a distance which is sufficient to prevent damage.

An apparatus having a mercury-vapor tube for performing this method is characterized in that the tube has a casing of quartz, especially synthetic quartz, and in that means for focussing rays into a beam are associated to the tube. With the aid of these means, it is possible to attain a radiation density which is such that the threshold value for initiating the exothermic reaction is reliably exceeded.

Figure 2:
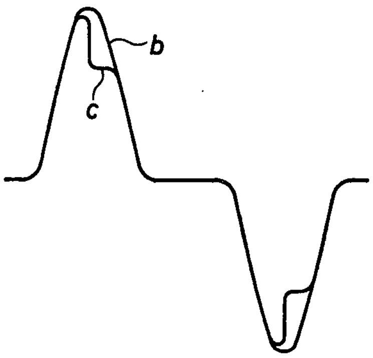
Figure 3:
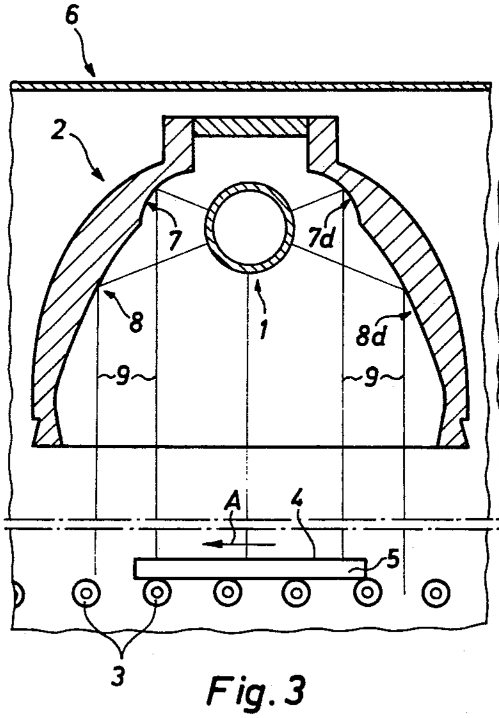
Figure 4:
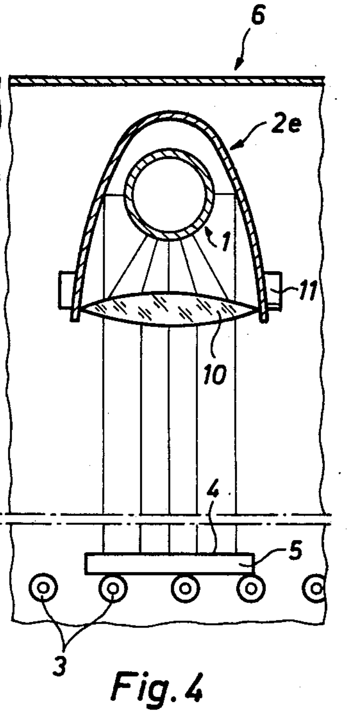

The above discussed and other objects, features and advantages of the present invention will become more apparent from the following description thereof, when taken in connection with the accompanying drawings in which two devices for focussing the rays of a high-pressure mercury-vapor tube into beams are schematically illustrated as a practical example of the subject matter of the application and in which FIG. 1 shows the conversion of an alternating current sine curve into a sinusoidal curve with the aid of a leakage transformer;

FIG. 2 shows the curve produced by said leakage transformer, altered by the high-pressure mercury-vapor tube; and FIGS. 3 and 4 show partial longitudinal sections of two different practical examples.

Referring now to the drawings, the practical example of FIG. 3 shows a high-pressure mercury-vapor tube 1 located in a reflector 2. Tube 1 and reflector 2 are arranged at right agles to the direction of travel of a roller conveyor 3, on which a substrate in the form of a plate 5 carrying a coating material 4 of an exothermically reacting substance can be conveyed in the direction of arrow A. All of the above is contained in a cabinet 6. A plurality of tubes 1 can be arranged longitudinally relative to the roller conveyor 3, preferably parallel to the direction of travel and one behind the other.

The distance between the electrodes in the high-pressure mercury-vapor tube can be 600 mm, for example. Its casing is of quartz, preferably synthetic quartz. The average current density in the tube is 3.3 A/sq.cm, effective with an alternating current of 220 V and a frequency of 50 Hz, with 100 pulses per second being produced. The tube 1 is connected with an unillustrated leakage transformer, which converts the sine curve *a* of the alternating current to a sinusoidal curve *b* in accordance with FIG. 1. FIG. 2 illustrates curve *b* again in conjunction with a curve *c* which results from the connection of tube 1 to the leakage transformer. Only in the peak of curve *c* is there electron acceleration, which corresponds to the quantum energy which appears necessary with respect to the frequency or the wavelength, in the present case 6.85 electron volts.

The high-pressure mercury-vapor tube 1 produces ultraviolet rays having a sufficient share of a frequency which corresponds to the resonant vibration of the molecules which combine with oxygen. This frequency corresponds to a wavelength of 197.4 nm with all coating materials which can be used with this method, in particular commercially available varnishes. Curing is further accelerated if a portion of the radiation also has a wavelength which corresponds to the resonance lines of oxygen, e.g. 184.9 nm. It has also been found that curing can be accelerated if a portion of the radiation also has a wavelength of 389.0 nm. When the coating material is being cured, an energy-producing or exothermic reaction occurs therein which is activated by at least one pulse which has a sufficient share of a certain wavelength. The coating material continues to react to a certain extent after this pulse. When this organic material is exposed to radiation its radical is excited in its resonant frequency. This radical participates in the curing process of coating materials which dry by oxidation, whereby oxygen is activated. The tube 1, to which an alternating current from the mains is applied, produces two pulses per phase.

The radiation density at the surface of tube 1 is so great that the desired exothermic reaction occurs if a coating material is located in its vicinity. However the coating material 4 and plate 5, which is often of a flammable material, cannot be placed in the immediate vicinity of the tube as it has a surface operating temperature of 600° to 700° C. However there is not a sufficient radiation density at a sufficient distance from tube 1 if the rays egressing from tube 1 are not in the form of a beam or if focussing cannot be achieved in such a manner as to produce a radiation density at a sufficient distance from tube 1 which corresponds approximately to the radiation density in the immediate vicinity of the lamp. In the practical example according to FIG. 3 a reflector is provided for this purpose, whose inner surface was determined empirically and which has two reflecting members 7 or **7*d* above the center of the tube and whose cross sections are designed in the nature of a quarter circle. These reflecting members 7 or 7*d* are arranged at a distance from tube 1 and correspond approximately to its radius. The members 8 or 8*d* of the inner surface abutting them at the bottom are designed with a parabolic cross section. The empirically determined reflector produces four beams of rays 9** extending at right angles to the direction of travel A, the energy of each beam being above the threshold value which initiates the exothermic reaction.

Surfaces 7, 8 or **7*d*, 8*d* are first vaporized with aluminum and then with quartz. The body of reflector 2 can be entirely of aluminum which is vaporized with quartz. Surfaces 7, 8 or 7, 8*d*** must reflect wavelengths of less than 200 nm. The surface roughness must not be greater than the wavelength to be reflected, and it is preferably smaller than the half wavelength to be reflected. Instead of aluminum, any substance can be employed as a surface coating which is capable of reflecting the desired wavelengths, especially below 200 nm.

The type of focussing and the shape of the reflector must be designed in such a manner that at least one beam of rays results which has a higher threshold value than is required to initiate the exothermic reaction.

According to the second practical example, a convex or concave cylindrical anamorphic lens 10 (collective lens) of quartz, preferably synthetic quartz, which also serves to focus the rays into beams can be employed instead of a reflector. Lens 10 is more expensive than reflector 2. Its focus must be set for wavelengths of less than 200 nm. Because the degree of refraction of the ultraviolet rays depends on the wavelength, lens 10 must be able to be set in accordance with the distance between the coating material 4 and tube 1, which is permitted by adjusting means arranged at the side of a reflector **2*e* having a parabolic cross section and surrounding tube 1**. It is also possible for the lens to be designed concave on only one side. The lens must serve to collect the rays.

A mains frequency of 50 Hz results in 100 pulses per second. The radiation period is relatively short, amounting to approximately 1/100 second. The width of the surface impinged by a beam of rays is approx. 5 mm. A normal advance of 1 to 400 m/min therefore is sufficient for every portion of the surface to be impinged by a ray. In actual practice, a plurality of beams are arranged one behind the other, as in the practical example.

There is a phase difference when a tube 1 is operated. To provide a uniform mains load, if there is a plurality of tubes each is connected with a different mains phase.

The apparatus according to the invention is for curing a coating of an organic substance which reacts exothermically after being activated by radiation and continues to react thereafter, especially a varnish which dries by oxidation, which is applied to a substrate. This can be a synthetic-resin varnish or an oil varnish, for example. These kinds of varnishes are relatively inexpensive and are therefore more frequently employed than other varnishes.

When a ray having a share of an effective wavelength of 197.4 nm strikes the surface of the coating material 4 it starts a reaction in the latter which continues into the interior of the coating in the form of a chain reaction. This reaction is very intensive, as a large number of molecules in the surface layer participate therein.

The number of pulses necessary for drying a varnish depends on the nature of the varnish, the size of tube 1, the percentage of effective radiation in the total radiation of the tube, the thickness of the coating material, the permeability of the coating for the radiation employed, etc.

The energy-producing or exothermic reaction of the coating material employed must be capable of being initiated by pulses of a certain frequency and continuing for at least a certain length of time after each pulse. For reducing the curing times, solvents with low boiling points and high evaporation factors, e.g. ethyl acetate, butanol, acetone, etc., can be added to the varnishes to be dried. It is also possible to add photosensitizers or photoinitiators or other light-reactive substances, e.g. ammonium bichromate, chromic acid, etc., to the coating material for the same purpose. However these substances are not necessary for curing the coating, although the addition of ammonium bichromate, from which chromic acid is formed at the moment of irradiation, has an additional curing effect.

The following table contains six different experiments with commercially available coating materials, with six high-pressure mercury-vapor burners arranged one behind the other and having an arc length of 600 mm each being employed. The high-pressure burners were connected to alternating current with an input of 5 kW per burner. The distance between each tube 1 and coating material 4, or plate 5, was 300 mm. Plate 5 was of degreased metal and the thickness of the coating was 30 microns.

The last column indicates drying times of objects which were hung on a rotating suspension unit performing one revolution per second. Tube 1 was arranged perpendicularly at a distance of 1.5 m from the axis of rotation.

| Coating material | Evaporating time (min) | Drying data in accordance with manufacturer's specifications (temperature/time) | Drying time (sec) | Drying time (rotary (suspension unit) (sec) |
|---|---|---|---|---|
| Wood oil | 0 | 48 hours at room temperature (polymerization begin) | 6 (Polymerization begin) | 30 |
| Phenol-modified baking varnish, alkyd base | 20 | 180° C/30 min | 10 | 45 |
| Alkyd resin varnish | 15 | 160° C/30 min | 15 | 60 |
| Alkyd resin varnish, air drying | (6) | 20° C/2-3 hrs | 10 | 45 |

-continued

| Coating material | Evaporating time (min) | Drying data in accordance with manufacturer's specifications (temperature/time) | Drying time (sec) | Drying time (rotary (suspension unit) (sec) |
|---|---|---|---|---|
| Plastic coating, vinyl base | 6 | 200° C/10 min | 15 | 60 |
| Baking varnish, acrylic resin | 6 | 160° C/12 min | 15 (without evaporation) | 60 |

Obviously, many modifications and variations of the present invention are possible in the light of the above teachings. It should therefore be understood that within the scope of the appended claims, the invention may be practiced otherwise than as specifically described.

Having thus fully disclosed our invention, what we claim is:

1. An apparatus for curing a coating applied to a substrate, which coating comprises an exothermically reacting organic substance, comprising a high pressure mercury-vapor tube for producing ultraviolet rays, said tube being located sufficiently distant from said substrate to prevent adverse heating of the substrate or of said organic substance and said tube being designed to produce sufficient radiation density to initiate the exothermic reaction of said organic substance; and a reflector casing, having a smooth reflective surface, arranged longitudinally about said tube for reflecting said rays into at least one beam directed at said substrate and comprising two opposed concave members spaced from said tube, each such member having a surface defining substantially a quarter circle and an adjacent parabolic configuration on the side facing the tube for focusing such rays into said directed beams, said arrangement of the reflector casing being designed in such a manner that at least one beam of rays with a threshold value which is sufficient to initiate such reaction is produced.

2. An apparatus according to claim 1 wherein the surface roughness of the reflective surface of said reflector is smaller than 400 nm thereby causing said reflector to reflect waves having wavelengths less than 400 nm.

3. An apparatus according to claim 1 wherein the exothermically reacting organic substance comprising the coating contains no photoinitiators.

4. An apparatus according to claim 1 wherein the reflective surface of said reflector casing is coated with quartz.

* * * * *